US006368571B1

(12) United States Patent
Vempati (10) Patent No.: US 6,368,571 B1
(45) Date of Patent: Apr. 9, 2002

(54) ZSM-5 MADE FROM SILICEOUS ASH

(75) Inventor: Rajan K. Vempati, Dallas, TX (US)

(73) Assignee: CHK Group, Inc., Dallas, TX (US)

( * ) Notice: Subject to any disclaimer, the term of this patent is extended or adjusted under 35 U.S.C. 154(b) by 0 days.

(21) Appl. No.: 09/493,923

(22) Filed: Jan. 28, 2000

(51) Int. Cl.$^7$ ................................................ C01B 39/38

(52) U.S. Cl. ................. 423/709; 423/712; 423/DIG. 22

(58) Field of Search ................................ 423/700, 709, 423/712, DIG. 22

(56) References Cited

U.S. PATENT DOCUMENTS

| | | | |
|---|---|---|---|
| 3,702,886 A | | 11/1972 | Arganer et al. |
| 4,199,556 A | * | 4/1980 | Plank et al. |
| 4,310,496 A | | 1/1982 | Achenbach et al. |
| 4,431,621 A | * | 2/1984 | Taramasso et al. |
| 4,526,767 A | | 7/1985 | Robinson et al. |
| 4,578,371 A | * | 3/1986 | Rieck et al. |
| 4,891,199 A | | 1/1990 | Latourrette et al. |
| 4,908,342 A | | 3/1990 | McWilliams et al. ......... 502/68 |
| 5,102,644 A | * | 4/1992 | Plank et al. |
| 5,240,892 A | | 8/1993 | Klocke .................... 502/77 |
| 5,369,071 A | | 11/1994 | Degnan et al. .............. 502/71 |
| 5,385,714 A | | 1/1995 | Thome et al. ........... 423/328.2 |
| 5,554,274 A | | 9/1996 | Degnan et al. ............. 208/111 |
| 5,772,980 A | | 6/1998 | Sul et al. .................... 423/705 |
| 5,783,321 A | | 7/1998 | Verduijn et al. ............ 423/702 |
| 5,965,105 A | * | 10/1999 | Rayalu et al. .............. 423/712 |
| 6,261,534 B1 | * | 7/2001 | Miller ....................... 423/700 |

FOREIGN PATENT DOCUMENTS

| | | | | |
|---|---|---|---|---|
| DE | 2940103 A | * | 5/1981 | |
| JP | 64-037412 A | * | 2/1989 | |

OTHER PUBLICATIONS

Shiralkar et al.; Synthesis of the Molecular Sieve ZSM–5 without the aid of templates; Sep., 1989, Zeolites, vol. 9.
Dai et al.; Crystallization of Pentasil Zeolite in the Absence of Organic Templates; 1989; Zeolites Synthesis, chapter 18.
Schweiger et al.; Synthesis of pentasil Zeolites With and Without Organic Templates;1989, Zeolites Synthesis, chapter 20.
Barrer; Hydrothermal Zeolite Synthesis; 1982; pp. 51–132.

* cited by examiner

Primary Examiner—David R Sample
(74) Attorney, Agent, or Firm—Bracewell & Patterson, LLP (57) ABSTRACT

The present invention relates in general to a method of making ZSM-5 zeolite. More specifically, the present invention relates to using plant waste material such as rice hull ash or any siliceous waste containing amorphous $SiO_2$ as a source for $SiO_2$ in making ZSM-5, thus producing a ZSM-5 that is lower cost than prior art methods. The method comprises providing siliceous ash having a carbon content between about 0 percent and 10 percent by weight of total rice hull ash, wherein the $SiO_2$ content is greater than 90 percent by weight of total siliceous ash, and wherein the $SiO_2$ and carbon are substantially amorphous. The synthesis of the ZSM-5 of the invention involves first suspending the siliceous ash in water. Next, a source of alumina is added to the suspension of siliceous ash. The source of alumina and siliceous ash are added such that the molar ratio of $SiO_2$ to $Al_2O_3$ in the ZSM-5 is in the range from approximately 15 to 150, thus forming a second suspension. Sodium Hydroxide is then added to the second suspension a quantity of NaOH, wherein the quantity added is such that the molar ratio of $Na_2O$ to $Al_2O_3$ in the ZSM-5 is between about 2 and 10, thus forming a third suspension. In order to precipitate the ZSM-5, the third suspension is seeded with silicalite and heated in a closed system at 150° C. to 220° C., thus yielding the ZSM-5.

20 Claims, 6 Drawing Sheets

ZSM-5 MADE FROM SILICEOUS ASH

CROSS-REFERENCE TO RELATED APPLICATION

The present application is related to copending application entitled "A Composition and Method of Forming Low-Carbon, Amorphous Siliceous Ash From Siliceous Waste Material" by inventor Rajan K. Vempati (application Ser. No. 09/493,294) filed Jan. 28, 2000 herein incorporated by reference.

BACKGROUND OF THE INVENTION

1. Field of the Invention

The present invention relates in general to a method of making ZSM-5 zeolite. More specifically, the present invention relates to using plant waste material such as rice hull ash as a source for $SiO_2$ in making ZSM-5, thus producing a ZSM-5 that is lower cost than prior art methods.

2. Description of the Prior Art

Zeolites are one of the most important classes of aluminosilicates. A zeolite may be defined as an aluminosilicate with a framework structure enclosing cavities occupied by large ions and water molecules. The framework consists of an open $(Al—SiO_2)\infty$ arrangement of corner-sharing tetrahedra plus enough cations to give electroneutrality and several water molecules to occupy the cavities.

The structure of zeolites is what gives them unique qualities. Synthetic zeolites are used, for example, as adsorbents in separation processes, as replacements for phosphates in detergents, and as components in catalysts in the petrochemical industry for converting hydrocarbons into other useful products. The porous structure of the zeolite allows different sized molecules to enter the pores, and the hydrophobic or polar interactions with those molecules act as a catalyst in that molecule's conversion to another useful target compound, either through rearrangement, addition, or extraction reactions. A larger pore might have a stronger affinity for larger chain hydrocarbons or highly branched hydrocarbons, for example, while small pores may have a higher affinity for smaller molecules such as water or ions. Thus, the size of the pore, or cavity size in combination with acidity can alter the catalytic properties of the zeolite.

The various stoichiometries of $SiO_2$, $Al_2O_3$, and other oxides lead to various zeolites. One such zeolite that is of great interest is called zeolite Socony Mobil-5 (SM-5), or simply ZSM-5. The preparation of ZSM-5 and its structure is disclosed in U.S. Pat. No. 3,702,886, the entire disclosure of which is incorporated herein by reference. The earliest ZSM5s were prepared using an organic template in the synthesis mixture which directs the formation of the ZSM-5 pore structure. The final structure of a ZSM-5 zeolite has a lattice configuration which encompasses three basic functional groups: $Al_2O_3$ and $SiO_2$, and $Na_2O$. Thus, ZSM-5s are often described in terms of these functional groups and their relative ratios within the zeolite lattice. The ratios of these groups, especially the $SiO_2/Al_2O_3$ molar ratio, is an important indicator of the useful properties the zeolite will possess. For instance, for catalytic cracking operations, zeolites are most useful with a the range of 15–150 $SiO_2/Al_2O_3$ molar ratio. Acid resistance and thermal stability also increase as this ratio increases. On the other hand, for adsorption and cation exchange uses, a decrease in the $SiO_2/Al_2O_3$ molar ratio increases the efficiency due to an increase in cations in the zeolite lattice.

Along with changing the $SiO_2/Al_2O_3$ molar ratio, control of the pore size and the general lattice structure of zeolites is often accomplished by use of templates such as tetrapropylammonium (TPA) salts. ZSM-5 zeolites prepared using an organic template are common, and generally have $SiO_2/Al_2O_3$ molar ratios of at least 60, and frequently greater. ZSM-5s can also be made using an inorganic base such as NaOH. Using NaOH, $SiO_2/Al_2O_3$ molar ratios of from 20 to 30 have been achieved. Further, the inorganic cations present influence the zeolite lattice framework and useful properties. While cations are necessary, if for no other reason, for charge balance, the identity of the cation can be chosen to tailor the zeolite. For ZSM-5 zeolites, Ba, Na, K, Li, Cs, $NH_3^+$ and mixtures thereof have been used in its synthesis.

There are several disadvantages to using organic templates. Since the synthesis of the ZSM-5 zeolite must be carried out under pressure while heating, these organic templating agents are a safety and/or environmental hazard once released into the atmosphere or water system. Further, these compounds add to the cost of producing ZSM-5. For instance, TPA alone often makes up as much as 50% of the production costs of ZSM-5 in prior art processes. Removing the templating agent, which is typically accomplished by combustion of the ZSM-5, can result in the degradation of the lattice structure of the zeolite. Thus, a process for producing ZSM-5 that does not require a template is highly desirable. One process of making ZSM-5 that does not use a template is disclosed by Thome et al. in U.S. Pat. No. 5,385,714, the entire disclosure of which is herein incorporated by reference.

Although the method of making ZSM-5 disclosed by Thome et al. excludes the use of templates, the cost of other starting materials is also a factor in the usefulness of zeolite catalysts. Thus, a further disadvantage with the prior art methods of manufacturing ZSM-5 and other zeolites is the cost of the primary starting materials. Reducing the cost of starting materials such as $SiO_2$ would further enhance the usefulness and commercial viability of ZSM-5, making its use possible in a greater range of industry and commerce. The present invention is directed to a method of using plant waste material such as rice hull ash or other siliceous wastes containing amorphous $SiO_2$ (plant and geothermal sludge, etc.) as a source for $SiO_2$ in making ZSM-5, and compositions thereof, both of which exclude the use of an organic templating agent.

SUMMARY OF THE INVENTION

One object of the present invention is to provide a method for the manufacture of a ZSM-5 from siliceous ash derived from waste plant material including siliceous plant residue from bio-gas operations, geothermal sludge, or any other siliceous waste containing amorphous $SiO_2$ or aluminosilicates, thus of relatively low cost and of ecological value.

Another object of the present invention is to provide a method of manufacturing a ZSM-5 with a carbon content between about 0% and 10% or more.

Another object of the present invention is to provide a method of manufacturing ZSM-5 that is not dependent upon the use of an organic templating agent.

Yet another object of the present invention is to provide a method of manufacturing ZSM-5 that allows an economically viable usage of the zeolite in wide ranging applications such as the controlled release of chemical compounds, deodorizers, toxic-waste cleanup, permeable barriers, and situations where activated carbon cannot be used, as well as traditional use in catalytic cracking of hydrocarbons and other catalytic processes.

These and other objects of the present invention are achieved by providing an improved method of manufacturing a ZSM-5 zeolite. The method comprises providing siliceous ash having a carbon content between about 0% and 10% by weight of total rice hull ash, wherein the $SiO_2$ content is greater than 90% by weight of total siliceous ash, and wherein the $SiO_2$ and carbon are substantially amorphous and/or graphitic. The synthesis of the ZSM-5 of the invention involves several steps, the exact order of which are not important, but are described as steps for convenience only. The first step is suspending the siliceous ash in water. Next, a source of alumina is added to the suspension of siliceous ash. The source of alumina and siliceous ash are added such that the molar ratio of $SiO_2$ to $Al_2O_3$ in the ZSM-5 is in the range from approximately 15 to 150, thus forming a second suspension. Sodium Hydroxide is then added to the second suspension, wherein the quantity of NaOH added is such that the molar ratio of $Na_2O$ to $Al_2O_3$ in the ZSM-5 is in the range of about 2–10, and preferably about 7.4, thus forming a third suspension. In order to precipitate the ZSM-5, the third suspension is seeded with highly pure $SiO_2$, silicalite, or ZSM-5 and heated in a closed system, thus yielding the ZSM-5.

The ZSM-5 of the invention is made from a siliceous ash that is characterized by having $SiO_2$ and carbon either amorphous and/or graphitic. Amorphous is desirable. The siliceous ash source can be any source of amorphous $SiO_2$ such as rice hulls and other plant waste materials as well as geothermal siliceous waste, siliceous sludge, rice hull waste from bio-gas production, etc, thus termed siliceous waste material. Further, the source of alumina and siliceous ash are added such that the molar ratio of $SiO_2$ to $Al_2O_3$ in the ZSM-5 is in the range of approximately 15 to 150. Also, the NaOH is added such that the ratio in the ZSM-5 of $Na_2O$ to $Al_2O_3$ is between about 2 and 10. Excess carbon can be removed by heating the ZSM-5 at 450° C. to 550° C. for 6 to 12 hours. However, the presence of amorphous carbon may be desirable in enhancing the hydrophobicity of the zeolite.

Additional objects, features and advantages will be apparent in the written description which follows.

DETAILED DESCRIPTION OF THE INVENTION

The present invention is a method of making ZSM-5 using a siliceous material produced from waste plant material or any siliceous wastes containing amorphous $SiO_2$, such as geothermal sludge, siliceous slags, plant waste material, etc. The siliceous ash is made by heating (pyrolyzing) the waste plant materials, materials such as common rice hulls having from 20% to 30% $SiO_2$ content, under certain desirable conditions. In particular, the volume of the furnace used to pyrolyze the waste plant materials should be large enough relative to the amount of material added to allow nearly complete combustion of the carbon in the waste plant materials to carbon monoxide and/or carbon dioxide if so desired. While it is desirable in the method of the invention to remove most of the carbon, it may be desirable to have a carbon content as high as 10% or more by weight of the ash, or as low as 0% by weight of the ash. The level of carbon is controlled by the temperature and time of pyrolysis. Further, there is a need for the passage and mixing of air, or oxygen enriched atmosphere, to enhance the combustion of the carbon and release as carbon monoxide and/or carbon dioxide.

The method of producing low-carbon, amorphous siliceous ash from waste plant materials comprises several steps. First, a known portion of waste plant materials of a known molar may be either ground to a particular particle size range, or obtained pre-ground, as is often the case when received at an incineration site. Optionally, the sample used can be ground after pyrolysis. Thus, particle size is not important in the pyrolysis step of the invention. Grinding can be accomplished by standard means known to those skilled in the art.

Next, the ground or un-ground waste materials are pyrolyzed at a temperature of between about 500 and 800° C. for at least 0.5 to 3 hours while simultaneously passing a continuous stream of air over the portion of rice hulls, thus forming siliceous ash. In one specific embodiment, the temperature is kept at about 600° C. The pyrolysis can be done in a tube or muffle furnace, wherein air or oxygen enriched air can be made to flow over the sample, and gaseous products from the pyrolysis reaction can be removed by vacuum or other devices. It is to be understood that any furnace having a known volume and ability to exchange gases can be used in the invention, reference to a tube or muffle furnace being illustrative only and not limiting to any particular type of furnace. Further, it is preferable to agitate the sample by mechanical and/or fluidized bed processes. While tube or muffle furnaces accomplish the method of forming the rice hull ash of the invention, it should be understood that other means of pyrolyzing the rice hulls can be used.

Whatever means is used to perform the pyrolysis, the weight ratio of the waste plant materials to the volume of the tube furnace should be kept to between approximately 0.02 to 0.10 (g/cm$^3$). The volume of the tube furnace is the internal volume of the portion of the furnace in which the siliceous material is held and where pyrolysis occurs, inlet gases flowing throughout the volume and exiting the furnace along with gases produced from the pyrolysis. This volume may vary considerably depending on the size and type of furnace used. The invention is in no way limited to a furnace with a specific volume. This ratio can be increased by drawing the gaseous product out of the chamber by vacuum or low pressure created to draw gasses from the furnace. The pyrolysis under these conditions results in a siliceous ash having a carbon content of less than 1% by weight of the siliceous ash and a silicon dioxide content of greater than 94% by weight of the rice hull ash. Typically, the siliceous ash has a density in the range from approximately 2.0 g/cm$^3$ to 2.3 g/cm$^3$. Finally, the silicon dioxide in the siliceous ash is substantially amorphous as shown in analytical studies discussed below.

Although the production of siliceous ash having a carbon content of less than 1% is described, a siliceous ash with a carbon content of between about 0% and 10% by weight ash is also desirable in some cases. This is accomplished by decreasing the pyrolysis temperature and/or decreasing the pyrolysis time. For example, a 3% level is achieved by heating at above 600° C. for 1.5 hours in one embodiment of the method of the invention.

The carbon in the siliceous ash used in the present invention is also characterized by being amorphous. Typically, commercial rice hull ash and other siliceous ash contains graphitic carbon. It is difficult to remove the graphitic form of carbon either by pyrolysis or chemical treatment. However, pyrolysis will remove amorphous carbon. Thus, an advantage of the present invention is to allow varying amounts of carbon to be present in the siliceous ash for a desired purpose. For example, the presence of amorphous carbon in the siliceous ash enhances the absorption capacity of the ash and the amorphous $SiO_2$ can provide a support matrix for the carbon when carbon is desirable.

Figure 1:
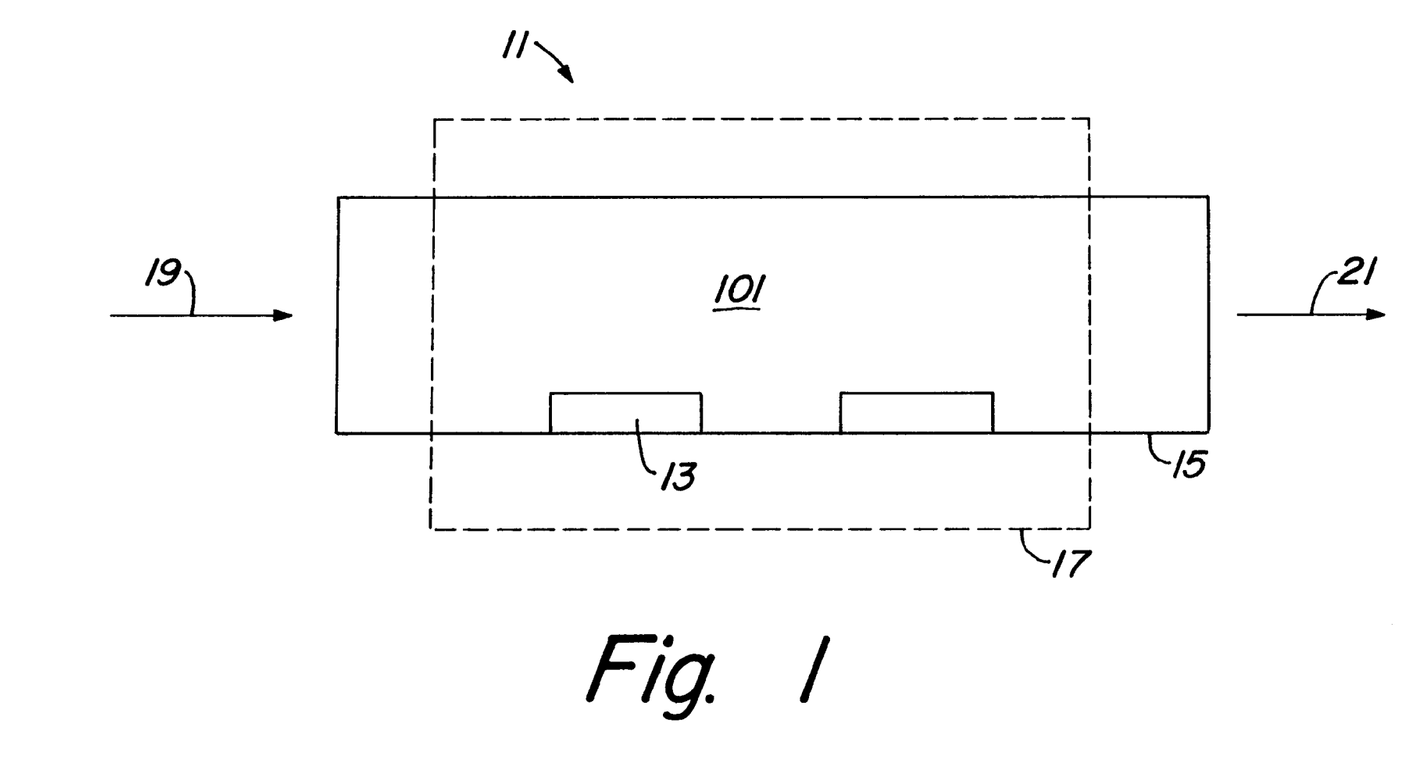
FIG. 1 is a schematic diagram of the furnace design used in the method of the invention.

The silicon-containing waste material used in one embodiment of the present invention is unprocessed rice hulls. A sample of ground rice hulls came from Busch Agricultural Resources, Inc. The rice hulls contained the following particle sizes: 12.78% of greater than 850 μm, 64.4% of 300–850 μm, 12.7% of 180–300 μm, and 9% less than 180 μm. The rice hulls were pyrolyzed in a tube furnace of 2.2 cm diameter and 12 cm length. FIG. 1 shows a schematic diagram of the tube furnace used in the invention. Furnace 11 contains two ceramic boats 13 that hold the samples to be pyrolyzed. The boats are placed in the furnace portion 15, the furnace portion having a volume 101, and supplying heat from heating unit 17 which surrounds the furnace. Optionally, the boats may be coupled to a conveyer means, whereby waste plant material can be conveyed into the furnace, and completely pyrolyzed ash can be conveyed out of the furnace. Air flows into the furnace as indicated by flow 19, and out of the furnace as indicated by flow 21. Typically, the resultant gas from the pyrolysis of waste plant materials is carbon monoxide or carbon dioxide, the source of carbon from the carbon monoxide or carbon dioxide being the carbon in the siliceous waste plant material.

Figure 2:
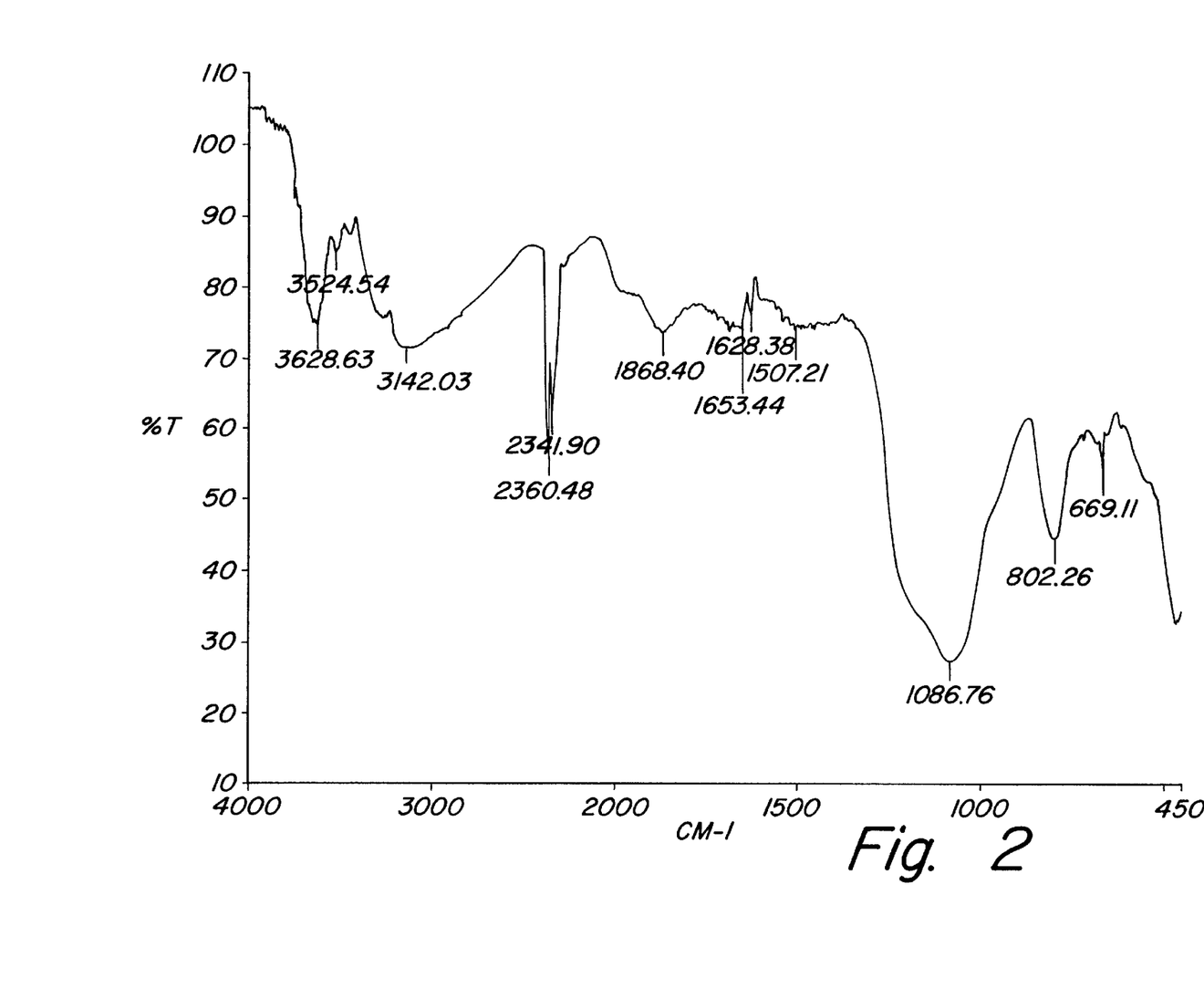
FIG. 2 is the FT-Infra Red spectrum of the rice hull ash used in the synthesis of the ZSM-5 of the present invention.

The siliceous ash used to make the zeolite of the present invention is primarily characterized by having an amorphous carbon content of between about 0% and 10% by weight of total rice hull ash, wherein the $SiO_2$ content is greater than 90% by weight of total rice hull ash, and wherein the $SiO_2$ is substantially amorphous. The amount of carbon present may be varied depending upon the final use of the zeolite. By amorphous it is meant that the $SiO_2$ of the siliceous ash has no long-range order and is X-ray amorphous, i.e., there is no distinct X-ray pattern, as seen in crystalline products, except for a halo (hump) at 0.40 nm. The specific characteristics are further elucidated by looking at the spectral data of FIG. 2 (FTIR data) described above.

The synthesis of the ZSM-5 of the invention is carried out free of the use of a templating agent. The lattice composition for a template free zeolite composition can be expressed in the following equation (1):

$$xSiO_2:Al_2O_3:yNa_2O:1500H_2O \quad (1)$$

where x is the molar ratio of $SiO_2$ to $Al_2O_3$, and y is the molar ratio of $Na_2O$ to $Al_2O_3$. The source of $SiO_2$ is amorphous $SiO_2$ found in the siliceous ash. The source of the $Na_2O$ is NaOH. The source of aluminum is typically $NaAlO_2$, although it is understood that other sources of aluminum oxide such as other alkali and alkaline aluminate salts (e.g., $KAlO_2$, $LiAlO_2$, $Ca(AlO_2)_2$, etc.), $Al_2O_3$, $Al(OH)_3$, AlOOH, and other mixed and/or partial hydrates, hydroxides, and oxides of aluminum can be used. Hereinafter, "source of alumina" or "alumina source" will be used to refer generally to any of the above named compounds, and it is understood by those skilled in the art that equivalents of aluminum from the given species are added, based upon molar ratios, to the reaction mixture as described in the specification and claims consistent with the stated desired ratios of $Al_2O_3$, $SiO_2$, and $Na_2O$ from equation (1).

Synthesis of the ZSM-5 of the invention is performed by the following procedure. In the present embodiment described, the source of the siliceous ash is rice hulls as described above. The rice hull ash with a carbon range from between about 0 and 10% as described above is first suspended in water. A quantity of an alumina source is then added to the rice hull ash suspension, wherein the quantity added is such that the ratio of $SiO_2$ to $Al_2O_3$ (x in equation (1)) in the ZSM-5 is in the range from approximately 15 to 150. Various embodiments having specific ratios are described further below. Next, a quantity of NaOH is added to the suspension wherein the quantity added is such that the ratio of the $Na_2O$ in the ZSM-5 of the invention to $Al_2O_3$ is in the range of about 2–10, and preferably about 7.4 (y in equation (1)). Hereinafter, the value of y is referred to by the $Na_2O/Al_2O_3$ ratio of the ZSM-5 lattice structure of the invention.

The suspension is then seeded with silicalite of ultra-high purity ($SiO_2/Al_2O_3$ is 50 to 2000), the silicalite or pure ZSM-5 preferably being added to an amount of about 1% by weight of the total suspension by weight. Further, it is preferable that the silicalite or pure ZSM-5 used for seeding is at least 99% pure. The pH of the system is not adjusted, the pH being highly basic due to the addition of NaOH.

The suspension is then heated at an autogenous pressure to yield the ZSM-5 of the invention. By autogenous pressure, it is meant that the suspension is heated in a closed system such as a standard reaction bomb (Parr bomb) known to those skilled in the art, the heating thus generating vapor and increasing the vapor pressure of the system. The suspension is heated at a temperature in the range from approximately 150° C. to 220° C., and preferably between about 180° C. to 190° C. Further, the heating should be sustained for a time period in a range from approximately 6 hours to 40 hours, and preferably between 18 and 20 hours.

Figure 3:
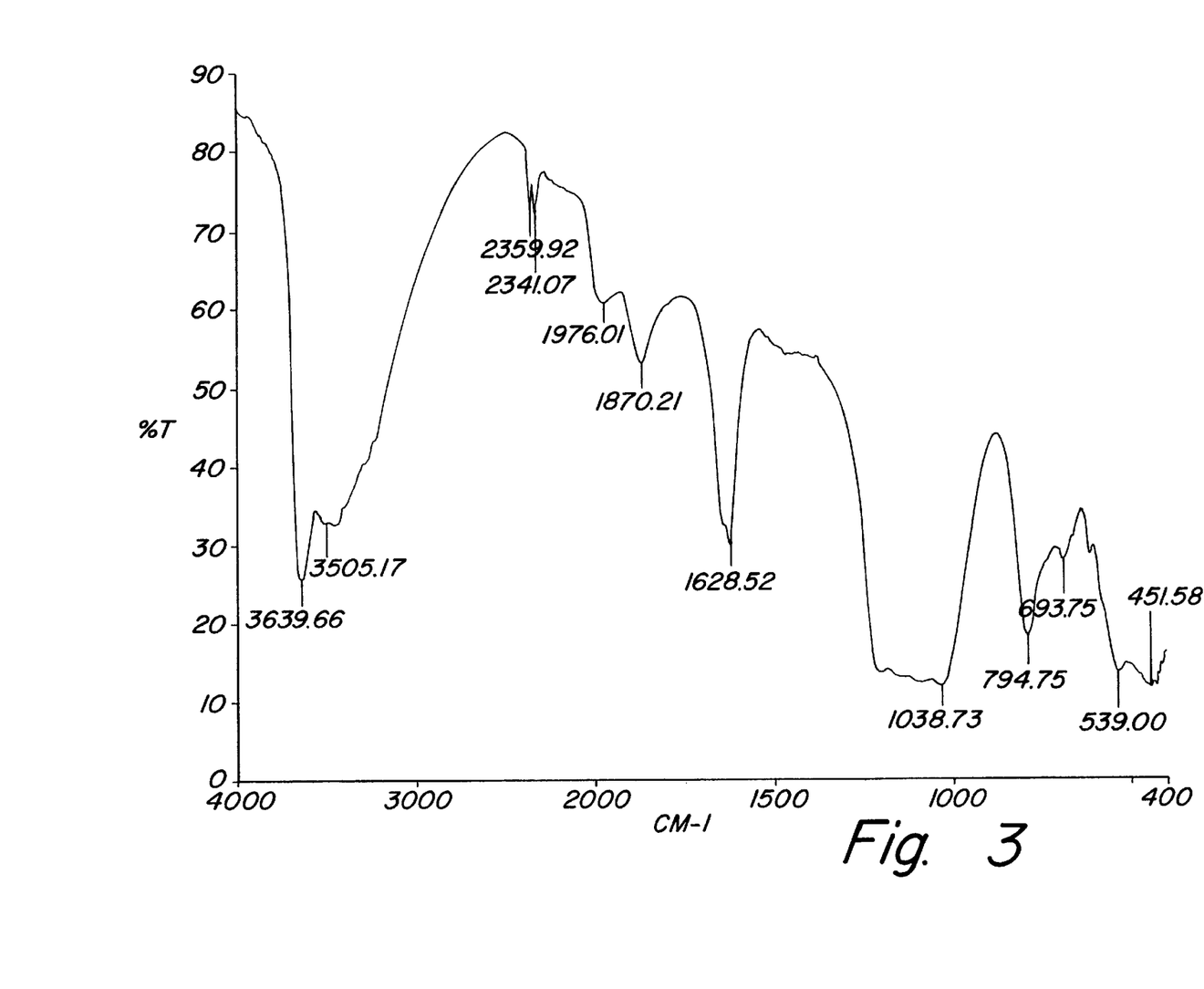
FIG. 3 is the FT-Infra Red spectrum of the ZSM-5 of the invention.

The FTIR spectrum of the ZSM-5 of the invention is shown in FIG. 3. The data from the spectrum is in Table 2 along with comparison data.

TABLE 1

Comparison of XRD Peaks of ZSM-5 Of the Invention and a Model ZSM-5.

| Model[1] | I/I$_o$ | 102[2] | I/I$_o$ | 68[3] | I/I$_o$ | 35[4] | I/I$_o$ |
|---|---|---|---|---|---|---|---|
| 1.118 | 100 | 1.112 | 27 | 1.123 | 31 | 1.114 | 18 |
| 1.002 | 89 | 0.989 | 21 | 1.004 | 19 | 1.004 | 21 |
| 0.903 | 24 | 0.902 | 15 | 0.902 | 11 | 0.902 | 13 |
| 0.637 | 9 | 0.639 | 18 | 0.639 | 11 | 0.639 | 10 |
| 0.596 | 12 | 0.599 | 15 | — | — | 0.599 | 12 |
| 0.459 | 4 | — | — | — | — | 0.452 | 11 |
| 0.437 | 7 | — | — | 0.437 | 15 | 0.437 | 13 |
| 0.426 | 8 | 0.426 | Q | 0.426 | Q | 0.426 | 17 |
| 0.401 | 4 | 0.401 | 57 | 0.407 | 78 | 0.401 | 21 |

TABLE 1-continued

Comparison of XRD Peaks of ZSM-5
Of the Invention and a Model ZSM-5.

| Model[1] | I/I$_o$ | 102[2] | I/I$_o$ | 68[3] | I/I$_o$ | 35[4] | I/I$_o$ |
|---|---|---|---|---|---|---|---|
| 0.385 | 100 | 0.386 | 100 | 0.386 | 100 | 0.386 | 100 |
| 0.382 | 78 | 0.382 | 75 | 0.382 | 78 | 0.382 | 82 |
| 0.375 | 36 | 0.375 | 33 | 0.375 | 31 | 0.376 | 54 |
| 0.372 | 37 | 0.372 | 60 | 0.372 | 62 | 0.372 | 55 |
| 0.365 | 21 | 0.365 | 72 | 0.365 | 35 | 0.365 | 21 |
| 0.344 | 9 | 0.343 | 39 | 0.346 | 19 | 0.347 | 24 |
| 0.335 | 7 | 0.335 | Q | 0.335 | Q | 0.339 | 25 |
| 0.332 | 9 | — | — | 0.331 | 15 | 0.332 | 20 |
| 0.305 | 9 | — | — | 0.306 | 23 | 0.304 | 22 |

[1]An XRD pattern of template-free ZSM-5 from Shiralkar and Clearfield (1988).
[2]ZSM-5 of the invention using molar ratio of SiO$_2$/Al$_2$O$_3$ = 102.
[3]ZSM-5 of the invention using molar ratio of SiO$_2$/Al$_2$O$_3$ = 68.
[4]ZSM-5 of the invention using a molar ratio of SiO$_2$/Al$_2$O$_3$ = 35.
Q = quartz.

TABLE 2

Comparison FTIR Data for Various Silicates.

| | Band Positions (cm$^{-1}$) | | | | | | | | |
|---|---|---|---|---|---|---|---|---|---|
| Sample | Asymmetric | | | | Symmetric | | | Ring[1] | Si—O[2] |
| RHA1.5[3] | 1230s | — | 1080b | 810 | — | 669 | — | — | — |
| ZSM-5[4] | 1212 | — | 1040 | 794 | 695 | — | 618 | 541 | 457 |
| SIL[5] | 1230 | 1110 | — | 804 | 686 | — | 628 | 586 | 550 455 |

[1]Double ring bending.
[2]Si—O bending.
[3]Rice hull ash pyrolyzed for 1.5 hours.
[4]Present invention.
[5]silicalite.
S = shoulder.
b = broad.

Figure 4:
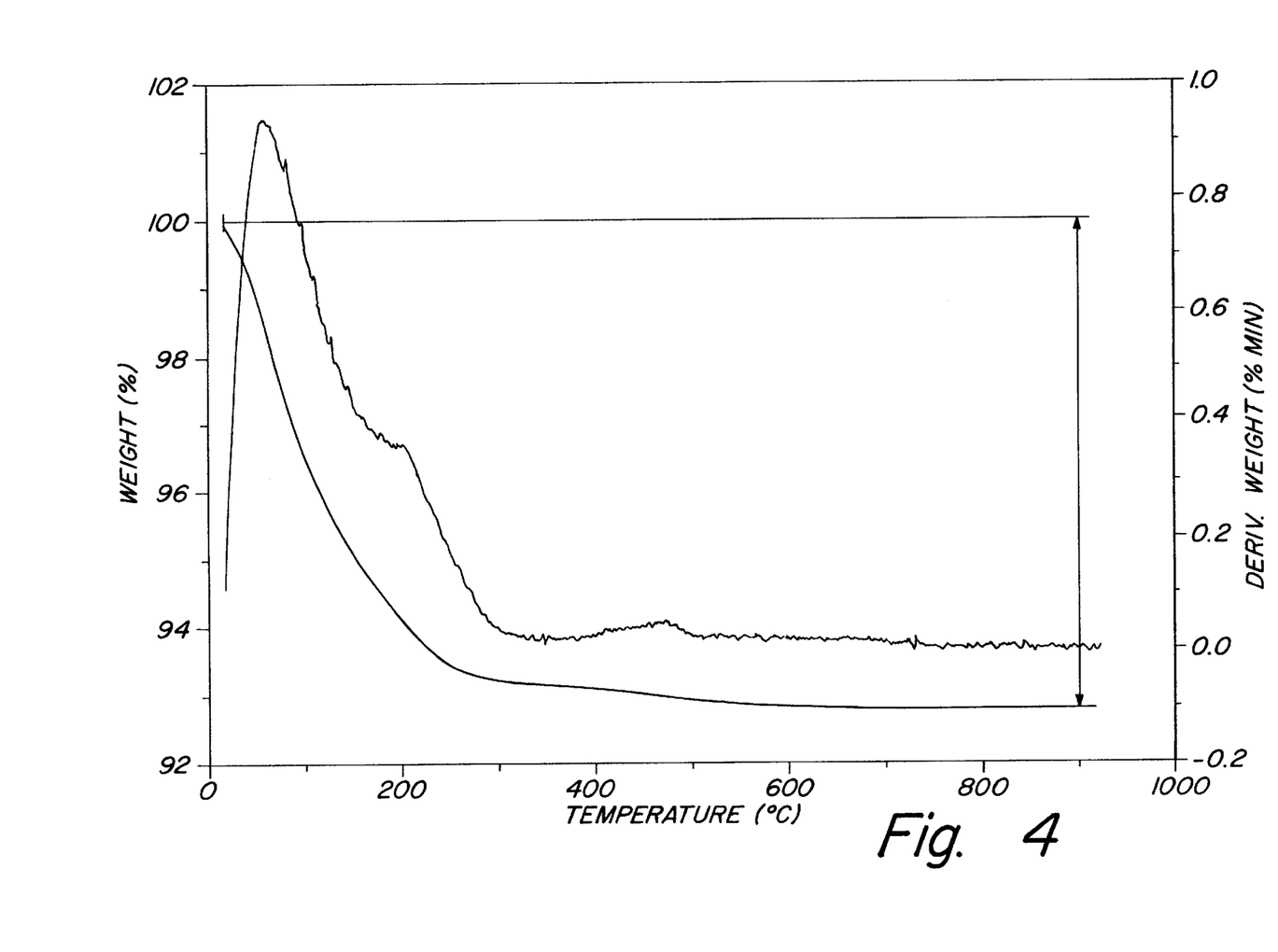
FIG. 4 is a graph of the results of a Thermogravimetric analysis of the ZSM-5 of the invention.

Thermogravimetric analysis (TGA) was performed on the rice hull ash containing less than 1% carbon used for making the ZSM-5 of the invention and compared to the ZSM-5 of the invention. These data are shown graphically in FIG. 4. These data show that the ZSM-5 weight loss was about 8% at 400° C.

Figure 5A:
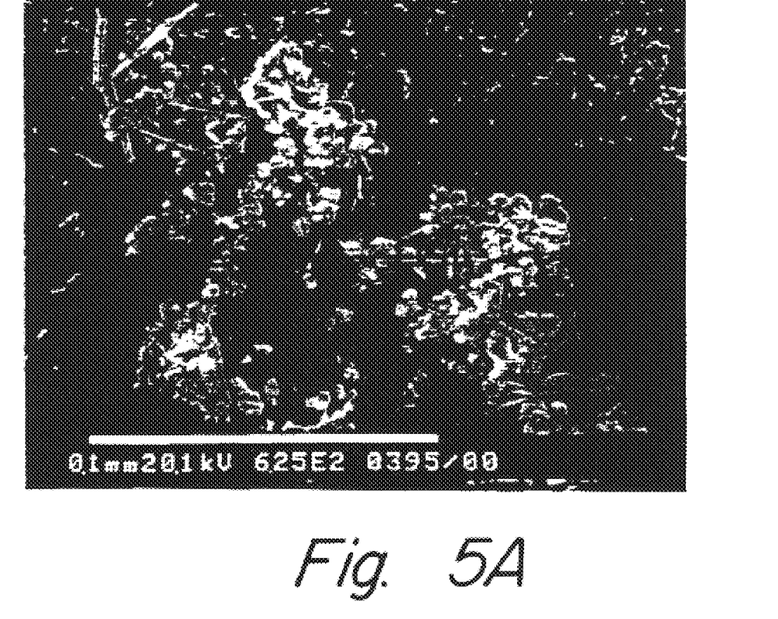
FIG. 5A and FIG. 5B are Scanning Electron Micrograph images of the ZSM-5 of the invention.
Figure 5B:
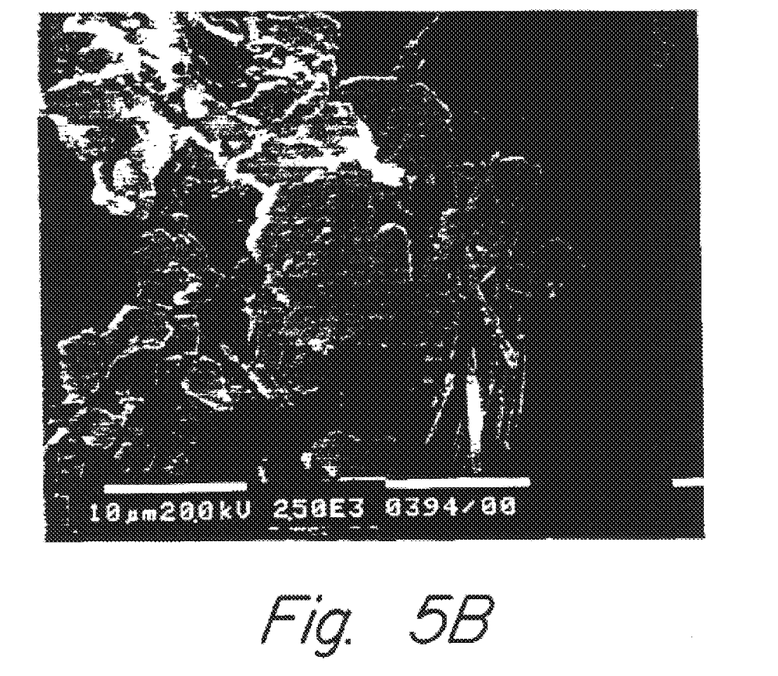

The ZSM-5 synthesized with SiO$_2$/Al$_2$O$_3$ in molar ratios of 68 and 102 and Na$_2$O/Al$_2$O$_3$ in a molar ratio of 7.4 results in the formation of mixed phases such as ZSM-5 and minor amounts of quarts and mordenite. A single ZSM-5 phase can be obtained by either decreasing the synthesis temperature and/or decreasing the synthesis time. The ZSM-5 synthesized with SiO$_2$/Al$_2$O$_3$ molar ratio of 35 and Na$_2$O/Al$_2$O$_3$ molar ratio of 7.4 results in a more pure form of ZSM-5. Unless otherwise indicated, when referring to the ZSM-5 of the invention, the Na$_2$O/Al$_2$O$_3$ molar ratio is always 7.4. In general, the morphology of the ZSM-5 of the invention was hexagonal, fibrous and rectangular lath shaped particles which are common in template-free systems. This is shown in FIG. 5A and FIG. 5B which shows an Scanning Electron Micrograph of the ZSM-5 of the invention.

Figure 6:
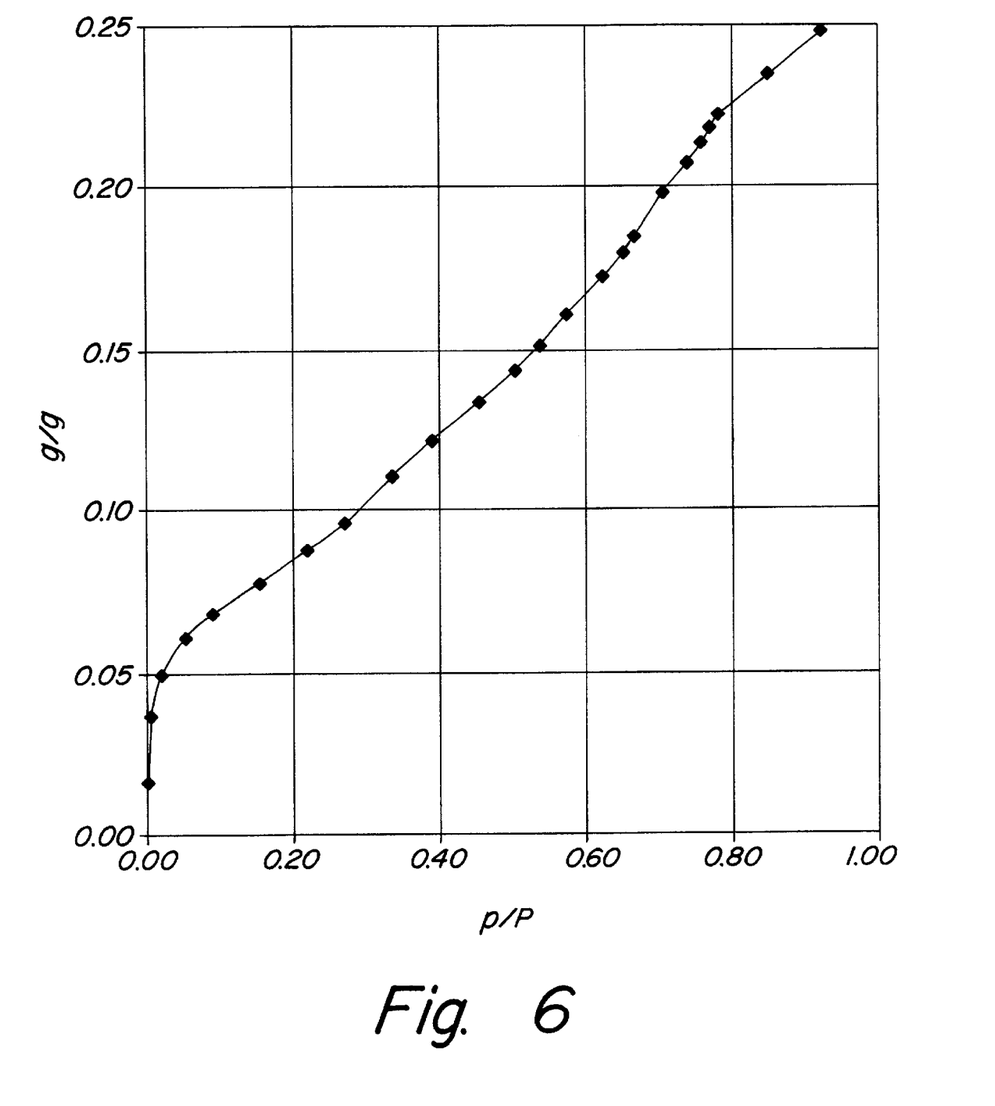
FIG. 6 is a graph of the results of a water adsorption isotherm of the ZSM-5 of the invention.

The ZSM-5 sample having a SiO$_2$/Al$_2$O$_3$ molar ratio of 35 exhibited only a Type IV adsorption and was less hydrophobic than the silicalite sample with which it was compared to. These data are shown in the water adsorption isotherms in FIG. 6. Silicalite is shown for comparison, silicalite is zeolite having a SiO$_2$/Al$_2$O$_3$ approaching ∞. The surface area of the SiO$_2$/Al$_2$O$_3$ molar ratio of approximately 35 sample was 800 m$^2$/g, with a particle density of 2.36 g/cm$^3$ and particle size of about 2 μm.

Table 3 shows the adsorption capacity of selected samples for n-hexane and 1,3-diaminopropane. Compared to silicalite, the adsorption capacity of the ZSM-5 synthesized from rice hull ash of the present invention is low because of low SiO$_2$/Al$_2$O$_3$, low surface area, and larger particle size compared to silicalite. For example, the ZSM-5 of the invention has a n-hexane absorption capacity of at least 3.74% weight of n-hexane by weight of the entire ZSM-5 sample and adsorbed n-hexane. This is compared to 6.08 weight percent for silicalite.

TABLE 3

Intracrystalline adsorption capacities by weight percent.[1]

| | n-hexane | | 1,3-diamino- |
|---|---|---|---|
| Sorbent | No degas | degas[2] | propane |
| silicalite | 6.08 | 8.08 | 4.6 |
| ZSM-5[3] | 3.74 | 4.77 | 0.8 |
| ARHA[4] | 4.61 | 4.15 | 0.9 |

[1]Values calculated based on the total molar of sorbent and adsorbent as a percent molar.
[2]Adsorption capacities obtained after degassing the samples at 200° C. for 4 hours.
[3]SiO$_2$/Al$_2$O$_3$ molar ratio is 35 of the present invention.
[4]Rice hull ash made by the process disclosed in Pat. No. 3,959,007.

The material balance for the products synthesized from rice hull ash was 91% yield based on the amount of rice hull ash added. Below are specific examples of the various embodiments of the invention.

EXAMPLE 1

ZSM-5 Synthesis with SiO$_2$/Al$_2$O$_3$ molar ratio of 35

One gram of siliceous material, in this embodiment rice hull ash as characterized above, was suspended in 4.2 grams of water. Then, in a different beaker, 0.2172 grams of NaOH and 0.076 grams of NaAlO$_2$ were dissolved in 5 grams of water. The molar ratios of SiO$_2$/Al$_2$O$_3$ and Na$_2$O/Al$_2$O$_3$ were 35 and 7.4, respectively. The contents of both the beakers were mixed and poured into a Parr bomb. This resulted in a suspension which was seeded with 1% silicalite, which has a $SiO_2/Al_2O_3$ molar ratio approaching infinity. The suspension was stirred intermittently for 30 minutes. The pH of the suspension was not adjusted. The Parr bomb was then placed in an oven and maintained at 190° C. for 18 hours. The Parr bomb was then allowed to cool and the contents washed with deionized water to remove excess NaOH. The solid was oven dried at 110° C. for six hours.

EXAMPLE 2

ZSM-5 Synthesis with $SiO_2/Al_2O_3$ molar ratio of 68

One gram of siliceous material, in this embodiment rice hull ash as characterized above, was suspended in 4.2 grams of water. Then, in a different beaker, 0.1132 grams of NaOH and 0.03458 grams of $NaAlO_2$ were dissolved in 5 grams of water. The molar ratios of $SiO_2/Al_2O_3$ and $Na_2O/Al_2O_3$ were 68 and 7.4, respectively. The contents of both the beakers were mixed and poured into a Parr bomb. This resulted in a suspension which was seeded with 1% by weight silicalite, which has a $SiO_2/Al_2O_3$ molar ratio approaching infinity. The suspension was stirred intermittently for 30 minutes. The pH of the suspension was not adjusted. The Parr bomb was then placed in an oven and maintained at 190° C. for 18 hours. The Parr bomb was then allowed to cool and the contents washed with deionized water to remove excess NaOH. The solid was oven dried at 110° C. for six hours.

EXAMPLE 3

ZSM-5 Synthesis with $SiO_2/Al_2O_3$ molar ratio of 102

One gram of siliceous material, in this embodiment rice hull ash as characterized above, was suspended in 4.2 grams of water. Then, in a different beaker, 0.0814 grams of NaOH and 0.0106 grams of $NaAlO_2$ were dissolved in 5 grams of water. The molar ratios of $SiO_2/Al_2O_3$ and $Na_2O/Al_2O_3$ were 102 and 7.4, respectively. The contents of both the beakers were mixed and poured into a Parr bomb. This resulted in a suspension which was seeded with 1% silicalite, which has a $SiO_2/Al_2O_3$ molar ratio approaching infinity. The suspension was stirred intermittently for 30 minutes. The pH of the suspension was not adjusted. The Parr bomb was then placed in an oven and maintained at 190°C. for 18 hours. The Parr bomb was then allowed to cool and the contents washed with deionized water to remove excess NaOH. The solid was oven dried at 110° C. for six hours.

The present invention uses siliceous ash containing amorphous carbon from 0 to 10% by weight of ash starting material. The amorphous carbon is useful for adsorption of hydrophobic molecules, whereas, for catalysis, carbon is deleterious. The level of carbon in the zeolite can be adjusted by heating or pyrolyzing the ZSM-5 at between about 450° C. to 550° C. for 6 to 12 hours. The level can also be adjusted by adjusting the pyrolysis time and temperature of the waste plant material in making the siliceous ash.

The present invention offers many advantages over the prior art ZSM-5. Due to the great interest in this zeolite for industrial applications such as fluid catalytic cracking, it is highly desirable to lower the cost of producing large quantities of the catalyst. Further, the present invention offers the advantage of using an otherwise disposable material that are of low cost. For example, the rice hulls that are used typically cost about $8 per ton in the United States. This is a small fraction of the current cost of $SiO_2$, which range between $160 and $250 per ton. Thus, the ultimate cost of the ash and hence the zeolite will be dramatically lowered.

The ZSM-5 acts as a catalyst for various processes such as fluid catalytic cracking, xylene isomerization, dewaxing, methanol to gasoline conversion, ethylbenzene synthesis, and p-methylstyrene synthesis. The ZSM-5 of the present invention, due to its hydrophobicity plus the presence of amorphous carbon, would be an ideal candidate for adsorption of volatile organic compounds generated by industries, agriculture and automobiles. Further, the ZSM-5 of the invention may be useful in deodorizers, hygienic products, and other commercially important products. The presence of from about 1% to 10% amorphous carbon (or more) in the ZSM-5 of the invention could further enhance its hydrophobicity, resulting in increased adsorption of hydrophobic molecules.

Another advantage of the ZSM-5 of the invention is the lack of costly organic templates, tetrapropylammonium (TPA) salts, and other compounds often used in prior art ZSM-5 processes. TPA alone often makes up as much as 50% of the production costs of ZSM-5 in prior art processes.

Another advantage is that there is no need for specialized scrubber equipment for burning excess organic compounds or TPA because they are not used in the process.

Another advantage is that the hydrothermal process time for making ZSM-5 from prior art methods using TPA is greatly lowered from 40 hours to less than 24 hours for the present process.

Another advantage of the present invention is that it avoids dealumination of aluminous zeolites to produce hydrophobic siliceous zeolite. Dealumination involves the use of toxic or environmentally undesirable chemicals such as $SiCl_4$, acid treatments, $(NH_4)_2SiF_6$, and other chemicals.

Another advantage of the present invention is the low cost of production which may lead to new markets for its use such as adsorption of toxic organic compounds in waste cleanup from air or water streams, capture of volatile organic compounds, odor control, slow release pesticides and herbicides, organic permeable barriers, fillers and other uses that prior art ZSM-5 cost would render its use prohibitive. The low cost also will allow sales of the ZSM-5 technology to major rice-producing countries in South Asia, Southeast Asia, and Pacific Rim countries.

While the invention has been shown in only one of its forms, it is not thus limited but is susceptible to various changes and modifications without departing from the spirit thereof.

What is claimed is:

1. A method of manufacturing a ZSM-5 zeolite, wherein the method comprises:

providing siliceous ash having a carbon content of between about 0 percent and 10 percent based upon the total weight of siliceous ash, wherein the $SiO_2$ content is at least 90 percent by weight of total siliceous ash, and wherein the $SiO_2$ and carbon are substantially amorphous;

suspending the siliceous ash in water;

adding to the suspension of siliceous ash a source of alumina and NaOH; and seeding the suspension with silicalite and heating the seeded suspension in a closed system, thus yielding ZSM-5.

2. The method of claim 1, wherein the source of the siliceous ash is pyrolyzed siliceous waste material.

3. The method of claim 1, wherein the source of alumina and siliceous ash are added such that the molar ratio of $SiO_2$ to $Al_2O_3$ in the ZSM-5 is in the range from approximately 15 to 150.

4. The method of claim 1, wherein the NaOH is added such that the molar ratio in the ZSM-5 of $Na_2O$ to $Al_2O_3$ is between about 2 and 10.

5. The method of claim 1, wherein the suspension containing siliceous ash, alumina, NaOH and silicalite is heated to a temperature in the range from approximately 150° C. to 220° C.

6. The method of claim 1, wherein the suspension is heated for a time period in the range from approximately 6 to 40 hours.

7. The method of claim 1, wherein the resulting ZSM-5 has a n-hexane absorption capacity of at least 3.74 percent weight of n-hexane by weight of the entire ZSM-5 sample and adsorbed n-hexane.

8. The method of claim 1, wherein the source of alumina is a salt of $AlO_2^-$.

9. A method of manufacturing a ZSM-5 zeolite, wherein the method comprises:
   providing siliceous ash having a carbon content between about 0 percent and 10 percent by weight of total siliceous ash, wherein the $SiO_2$ content is at least 90 percent by weight of total siliceous ash, and wherein the $SiO_2$ and carbon are substantially amorphous;
   suspending the siliceous ash in water;
   adding to the suspension of siliceous ash a source of alumina, wherein the source of alumina and siliceous ash are added such that the molar ratio of $SiO_2$ to $Al_2O_3$ in the ZSM-5 is in the range from approximately 15 to 150, thus forming a second suspension;
   adding to the second suspension a quantity of NaOH, wherein the quantity added is such that the molar ratio of $Na_2O$ to $Al_2O_3$ in the ZSM-5 is between about 2 and 10, thus forming a third suspension;
   seeding the third suspension with silicalite and heating the seeded third suspension in a closed system, thus yielding the ZSM-5.

10. The method of claim 9, wherein the source of the siliceous ash is pyrolyzed siliceous waste material.

11. The method of claim 9, wherein the third suspension is heated at a temperature in the range of approximately 150° C. to 220° C.

12. The method of claim 9, wherein the heating of the seeded third suspension is maintained for a time period in the rang e of approximately 6 and 40 hours.

13. The method of claim 9, wherein any carbon in the ZSM-5 is removed by heating the ZSM-5 to between about 450° C. and 550° C. for between about 6 hours to 12 hours.

14. The method of claim 9, wherein the ZSM-5 has a n-hexane absorption capacity of at least 3.73 percent weight of n-hexane by weight of the entire ZSM-5 sample and adsorbed n-hexane.

15. The method of claim 9, wherein the source of alumina and siliceous ash are added such that the molar ratio of $SiO_2$ to $Al_2O_3$ in the ZSM-5 is approximately 35.

16. The method of claim 9, wherein the source of alumina and siliceous ash are added such that the molar ratio of $SiO_2$ to $Al_2O_3$ in the ZSM-5 is approximately 68.

17. The method of claim 9, wherein the source of alumina and siliceous ash are added such that the ratio of $SiO_2$ to $Al_2O_3$ in the ZSM-5 is approximately 102.

18. The method of claim 9, wherein the third suspension is heated for a time period in the range of 15 to 24 hours.

19. The method of claim 9, wherein the third suspension is heated for a time period of approximately 18 hours.

20. The method of claim 9, wherein the source of alumina is a salt of $AlO_2^-$.

* * * * *